United States Patent [19]

Nishino et al.

[11] 4,043,769

[45] Aug. 23, 1977

[54] PROCESS FOR RECOVERING A SOLVENT VAPOR

[75] Inventors: Mutsumi Nishino, Chigasaki; Hideo Sasaki, Tokyo; Kazumi Uda, Fukuyama; Motohiko Tamura, Mihara; Kunihiko Hiyama, Mihara; Hiroshi Fujiike, Mihara, all of Japan

[73] Assignees: Mitsubishi Jukogyo Kabuskiki Kaisha; Shell Sekiyu Kabushiki Kaisha, both of Tokyo, Japan

[21] Appl. No.: 640,564

[22] Filed: Dec. 15, 1975

[51] Int. Cl.² .............................................. B01D 53/16
[52] U.S. Cl. .......................................... 55/25; 55/89; 55/189
[58] Field of Search ................... 55/88, 32, 58, 25, 57, 55/89, 189

[56] References Cited

U.S. PATENT DOCUMENTS

| 3,830,074 | 8/1974 | Nichols | 55/88 X |
|---|---|---|---|
| 3,867,111 | 2/1975 | Knowles | 55/88 X |
| 3,886,759 | 6/1975 | McNamee | 55/88 X |

*Primary Examiner*—Frank A. Spear, Jr.
*Assistant Examiner*—E. Rollins Cross
*Attorney, Agent, or Firm*—Cushman, Darby & Cushman

[57] ABSTRACT

A process is provided for recovering a solvent vapor from a mixed gas of the solvent vapor and air. From a vessel storing a mixed gas of the solvent vapor and air, the mixed gas is passed through a compressor to be compressed to a low degree, the resultant compressed mixed gas is introduced to a first absorption column, where said compressed mixed gas is brought into contact with a first absorbent to absorb and recover a greater part of the solvent vapor. A gas coming out from the first absorption column is introduced to a second absorption column, where said gas is brought into contact with a second absorbent.

2 Claims, 2 Drawing Figures

PROCESS FOR RECOVERING A SOLVENT VAPOR

BACKGROUND OF THE INVENTION

Heretofore, as a process for liquefying and recovering a solvent vapor from a mixed gas, a process for compressing and liquefying the mixed gas, a process for cooling and liquefying the mixed gas and a process for absorbing the mixed gas to a heavy weight hydrocarbon liquid having a low vapor pressure have been known.

However, in the process for compressing and liquefying the mixed gas, the compression pressure must be raised for heightening the recovery efficiency, for that end, a process which comprises providing a saturator before the compressor for the purpose of securing safety and raising the concentration of a solvent vapor in the mixed gas to above the explosion limit, thereafter compressing the mixed gas is adopted. Heightening the concentration of the solvent vapor is evaporating and gasifying the solvent and adding the gasified solvent to the mixed gas, namely, this process carries out an operation opposite to recovery, which is the object of the present invention, therefore, this process does not meet the object of the present invention. In the process for cooling and liquefying the mixed gas, when the mixed gas is cooled to below the freezing point, the moisture of air in the mixed gas coheres, eventually freezes and obstructs the normal driving, which is a drawback. In order to prevent this freezing point phenomenon, sometimes a means of adding a freezing preventing agent or an antifreezing liquid is taken, however, in this case an additional step of separating these additives from a solvent is required, which is not preferable. As a process for absorbing the mixed gas by a heavy weight hydrocarbon liquid having a low vapor pressure, there are (a) a method of heating a solvent, for example, a gasoline liquid to evaporate a light weight component and utilizing the remaining heavy weight component as an absorbing liquid, (b) a method of utilizing kerosene as an absorbing liquid, and (c) a method of utilizing kerosene as an absorbing liquid and using the same by regenerating and circulating. However, in the method (a), not only an apparatus for gathering a non-evaporating component as a heavy weight component is required, but also an apparatus for compressing, cooling and liquefying the evaporated light weight component and returning said component to a storing tank is required, and this method (a) has a drawback in that the apparatus as a whole becomes complicated. In the method (b), although kerosene is available at a low price, not only a large amount of kerosene is required, but also there is a problem in regenerating means of kerosene having absorbed a solvent vapor. In the method (c), a solvent vapor is absorbed by an absorbing liquid such as kerosene or light oil, the absorbing liquid is forwarded to a flush drum, where the absorbing liquid is decompressed by a vacuum pump to evaporate and separate a light weight component (for example, a gasoline component) and the absorbing liquid is regenerated, circulated and reused, however, because the entire solvent vapor is once absorbed by the absorbing liquid and thereafter, all the solvent component is vacuum evaporated and separated by a vacuum pump, devices for cooling and liquefying the evaporated and separated solvent vapor are separately required, which is a drawback.

The present inventors conducted studies with a view to developing a process not particularly requiring a high pressure, an antifreezing liquid and a freezing preventing agent with reference to a process for recovering a solvent vapor free of the drawbacks of these conventional processes, having reached the present invention as a result.

SUMMARY OF THE INVENTION

The gist of the present invention resides in (1) a process for recovering a solvent vapor from a mixed gas of the solvent vapor and air which comprises (a) passing the mixed gas of a solvent vapor and air from a storing vessel for a mixed gas of a solvent vapor and air through a compressor to compress the mixed gas to a low degree and introducing the lightly compressed mixed gas to a first absorption column, bringing the lightly compressed mixed gas into vapor-liquid contact with a first absorbent to absorb and recover a greater part of the solvent vapor in said first absorption column, (b) introducing a gas coming out of the first absorption column to a second absorption column and bringing said gas into vapor-liquid contact with a second absorbent circulating while being cooled in said second absorption column, and (2) a process for recovering a solvent vapor from a mixed gas of the solvent vapor and air which comprises (a) at a time when a second absorbent is saturated by the solvent vapor and loses its absorbing capacity, stopping the flow of said mixed gas to a compressor and returning a gas coming out from a first absorption column to a vessel storing said mixed gas, at the same time, (b) functioning said compressor as a vacuum pump, forwarding a gas in a second absorption column into the first absorption column to reduce the pressure inside the second absorption column, evaporating and gasifying a solvent component absorbed in an about saturated state in the second absorbent stopped to be cooled to regenerate the second absorbent, (c) subsequently introducing an evaporated and gasified gas consisting mainly of the solvent vapor to the first absorption column, bringing said gas into vapor-liquid contact with a first absorbent to absorb and recover the solvent vapor, returning a gas containing a trace of the solvent vapor not absorbed and recovered to said mixed gas storing vessel or supplying a part of said gas into the second absorption column to exclude the solvent component in the second absorbent, and (d) at a time when the absorbing capacity of the second absorbent inside the second absorption column recovers, applying again the process of (1), above.

And these processes are especially suitable for recovering a gasoline vapor from a mixed gas of an evaporated gasoline and air existing in a gaseous phase of a storing tank of an oil tank and from the similar mixed gas generated upon loading and unloading gasoline to and from a tank truck (lorry) and a tanker.

DETAILED DESCRIPTION OF THE INVENTION

Hereinbelow, referring to the accompanying drawing showing one embodiment of the present invention, a detailed explanation will be made with recovery of a gasoline vapor taken as an example.

Figure 1:
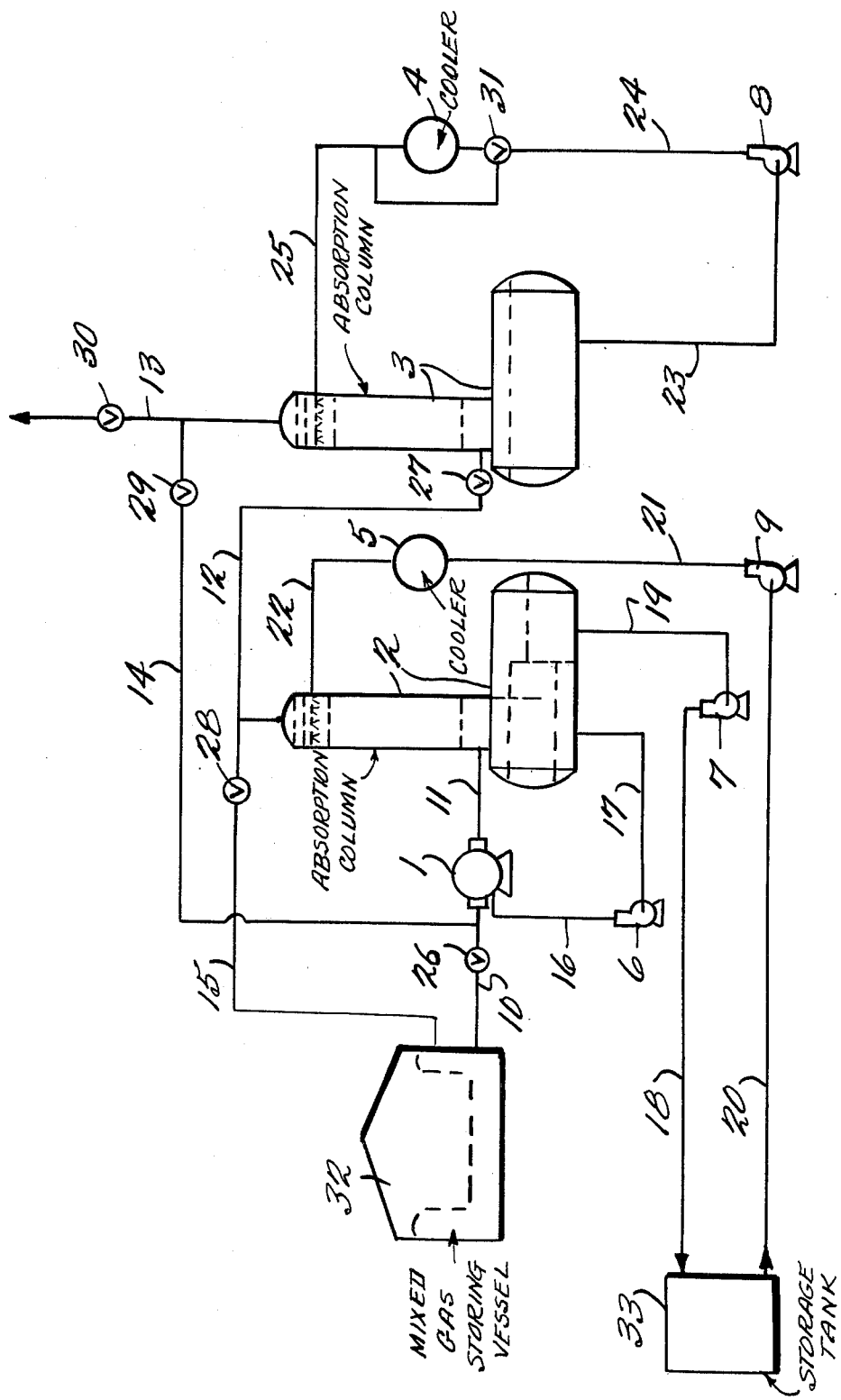
FIG. 1 and FIG. 2 are flow sheets illustrating the special embodiments of the present invention with a gasoline vapor taken as an example.

In FIG. 1, a mixed gas of a gasoline vapor generated in oil tank and air is stored in a mixed gas storing vessel 32, forwarded to a water-sealing type compressor 1 which may function also as a water-sealing vacuum pump via a line 10 and a valve 26 and compressed to a low degree. In this water-sealing type compressor 1, because the mixed gas is compressed in a watersealed wet state, elevation of temperature by pressurization is repressed (the temperature of the compressor is about 45° C), safe compression becomes possible and a saturator can be done away with. The compressed mixed gas passes a line 11 together with sealing water for the compressor in a mixed vapor-liquid phase and is forwarded to a first absorption column 2. The first absorption column 2 consists of a combination of the upper absorbing portion and the lower portion for separating oil from water, in the absorbing portion, the mixed gas forwarded via the line 11 is brought into countercurrent vapor-liquid contact with a cooled gasoline liquid which is a first absorbent descending from a line 22 provided at the top of the first absorption column 2 and a greater part of the gasoline vapor in the mixed gas is cooled, liquefied and absorbed, descending onto the lower portion for separating oil from water together with the absorbing liquid and cooled, liquefied moisture. The operating temperature at this time is above the freezing point so as not to freeze the moisture, however, it should be controlled to a temperature as low as possible within this limit. While staying in this portion for separating oil from water, the moisture is more cooled by a cooled gasoline liquid and as sealing water of the water-sealing compressor 1, it is circulated to the water-sealing type compressor 1 via a line 17, a pump 6 and a line 16, while the separated gasoline liquid is returned to a gasoline liquid storing tank 33 via a line 19, a pump 7 and a line 18. In FIG. 1, the route of the cooled gasoline liquid descended from a line 22 at the top of the first absorption column 2 is shown as forwarded from the gasoline liquid storing tank 33 via a line 20, a pump 9, a line 21 and a cooler 5, however, it is possible to freely take the route of the gasoline liquid taken out from the lower portion for separating oil from water via the line 19, above the line 21 directly via the pump 9.

In the first absorption column 2, a greater part of the gasoline vapor is liquefied and recovered, however, in the mixed gas coming out from the line 12 at the column top, the noncohered gasoline vapor is contained and for further recovery thereof, the mixed gas is forwarded to a second absorption column 3 via a line 12. The second absorption column 3 consists of a combination of the upper absorbing portion and the lower storing portion for an absorbing liquid, in the absorbing portion, the mixed gas forwarded from below via the line 12 and a valve 27 is brought into countercurrent vapor-liquid contact with a cooled heavy weight hydrocarbon liquid which is a second absorbent descending from a line 25 provided at the top of the second absorption column 3, the gasoline vapor not absorbed in the first absorption column 2 is further cooled, liquefied and absorbed by the cooled heavy weight hydrocarbon liquid (oil) and recovered. The treated gas is released into the atmosphere from the column top of the second absorption column 3 via the line 13 and a valve 30. The heavy weight hydrocarbon liquid having absorbed the gasoline component comes to have a somewhat high saturated vapor pressure, however, it passes through a line 23 and is pressurized by a pump 8, passing through a cooler 4 via a line 24 and a valve 31 to be cooled and circulated from the line 25 and is used as a second absorbent of the second absorption column 3. The operating temperature of the second absorption column 3 is above the freezing point so as not to freeze the moisture, however, it should be controlled to a temperature as low as possible within this limit.

The foregoing explanation relates to the operating situations for recovering a gasoline vapor and when such operations are continued, the heavy weight hydrocarbon liquid which is the second absorbent circulating in the second absorption column 3 is gradually saturated by the gasoline component and eventually lowers in absorbing capacity, therefore, a regeneration operation for recovering the absorbing capacity of this second absorbent becomes necessary.

Hereinbelow, an explanation will be made about the regeneration operation, however, because a mixed gas of a gasoline vapor and air generates only on limited occasions such as at the time of loading and unloading an oil aboard a tanker or loading to a tank truck (lorry), the regeneration operation may be carried out at a time when such operations are not carried out.

Upon carrying out the regeneration operation, at first the valve 26 is closed to stop supply of the mixed gas to the first absorption column 2, next a gas existing in the first absorption column 2 is returned to the mixed gas storing vessel 32 from the column top of the first absorption column 2 through a line 15 via a valve 28 in an opened state. At this time, because the valve 27 provided in the route of the line 12 opposing the line 15 is closed, the gas does not flow in the line 12.

Then, the aforementioned water-sealing type compressor 1 is functioned as a vacuum pump, a valve 29 in a line 14 branched from the line 13 coming from the column top of the second absorption column 3 is opened (at this time, the valve 30 on the line 13 is closed) to absorb a gas existing in the second absorption column 3 to place the second absorption column 3 under a reduced pressure.

At a time when reduction of pressure inside the second absorption column 3 comes to be carried out, the valve 31 provided in the circulating route of the heavy weight hydrocarbon liquid (oil) which is the second absorbent is switched over and the second absorbent does not pass through the cooler 4, but by-passes, therefore, the cooling operation of the second absorbent is adapted to be stopped. The second absorbent so stopped to be cooled is caused to descend from the top of the second absorption column 3 via the line 25 onto the second absorption column 3 placed under a reduced pressure, therefore, the gasoline component absorbed into the second absorbent is evaporated and gasified. This evaporated and gasified gasoline component is supplied from the top of the second absorption column 3 by the action of the vacuum pump 1 to the first absorption column 2 via the line 13, the valve 29, the line 14 and the vacuum pump 1 and is brought into countercurrent vapor-liquid contact with a cooled gasoline liquid descended from the line 22 at the top of the first absorption column 2. The pressure inside the first absorption column 2 becomes close to atmospheric pressure different from superatmospheric pressure at the time of recovery, but the first absorption column 2 is to absorb the gasoline vapor forwarded from the second absorption column 3 placed under a further reduced pressure by the action of the vacuum pump by the cooled gasoline liquid and upon carrying out the regeneration operation also, the first absorption column 2 carried out recovery of the gasoline vapor though the pressure condition is different. The gasoline vapor not absorbed herein may be, as mentioned above, returned to the mixed gas storing vessel 32 from the line 15 via the valve 28 or a part of said non-absorbed gasoline vapor may be supplied to the second absorption column 3 via the line 12 and the valve 27 by opening to some extent the valve 27 which was closed and used for excluding the gasoline component in the second absorbent. Especially, when the latter means is adopted, the pressure inside the second absorption column 3 need not be so reduced, therefore, the burden of the vacuum pump does not have to be a lot, which is economical.

At a time when the foregoing regeneration operation is carried out for a predetermined period of time and the absorbing capacity of the second absorbent recovers, when the valves in various places are returned to the original states, the apparatus as a whole is placed under atmospheric pressure. At this time, by functioning the water-sealing compressor 1 as a compressor, the recovery operation of the gasoline vapor from the mixed gas of the gasoline vapor and air is to start again.

Figure 2:
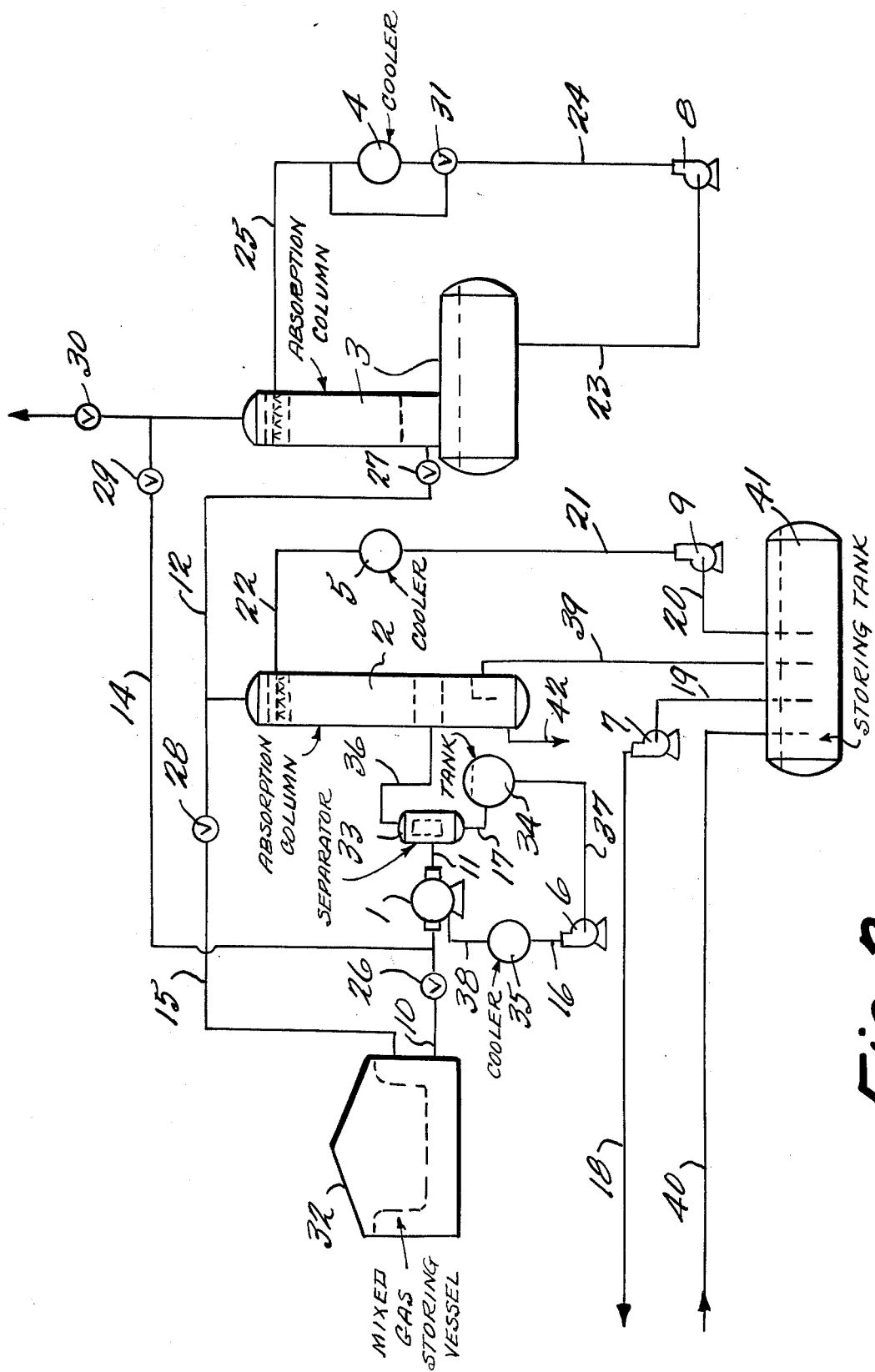

When another embodiment of the present invention is shown by reference to FIG. 2, marks in FIG. 2 the same as the marks in FIG. 1 denote the parts the same as in FIG. 1. The same as explained in connection with FIG. 1, a mixed gas of a gasoline vapor and air forwarded to a water-sealing type compressor 1 which may be functioned also as a water-sealing type vacuum pump via a line 10 and a valve 26 is compressed to a low degree in said compressor 1, passing through a line 11 in a vapor-liquid mixed phase with sealing water for the compressor 1 and enters a separator 33. The mixed gas separated from the sealing water in the separator 33 is forwarded to a first absorption column 2 via a line 36. The first absorption column 2 consists of a combination of the upper portion and the lower portion for separating oil from water, in the absorbing portion, the mixed gas forwarded via the line 36 is brought into countercurrent vapor-liquid contact with a cooled gasoline liquid which is a first absorbent descending from a line 22 provided at the top of the first absorption column 2, a greater part of a gasoline vapor in the mixed gas is cooled, liquefied and absorbed, falling onto the lower portion for separating oil from water together with an absorbing liquid and the cooled, liquefied moisture. The operating temperature at this time is above the freezing point so as not to freeze the moisture, however, it should be controlled to a temperature as low as possible within this limit the same as in the case of the embodiment illustrated in FIG. 1. In the lower portion for separating oil from water of the first absorption column 2, moisture is separated from a gasoline liquid by difference in specific gravity and the moisture is discharged to the outside of the system via a line 42 successively, but the gasoline liquid is forwarded to a recovered gasoline liquid storing tank 41 via a line 39. The gasoline liquid stored in this recovered gasoline liquid storing tank 41 is circulated in a line 20, a pump 9, a line 21, a cooler 5 and a line 22. As such, in case the gasoline liquid stored in the recovered gasoline storing tank 41 is circulated and used as an absorbing liquid of the first absorption column 2, the absorbing capacity of the gasoline liquid gradually lowers, therefore, in order to recover said absorbing capacity, fresh gasoline should be periodically supplemented to the recovered gasoline liquid storing tank 41 from a line 40, at the same time, the amount increased by supplement should be shipped to, for example, a tank truck (lorry) via a line 18 in a mixed state with the recovered gasoline. Incidentally, the composition of this gasoline to be shipped is naturally within the quality standard.

The sealing water separated from the mixed gas in the separator 33 passes through a line 17, a liquid surface control tank 34, a line 37, a sealing water pump 6, a line 16 and reaches a sealing water cooler 35, where it is cooled to a predetermined temperature, thereafter, it is circulated and used as sealing water for the water-sealing type compressor 1 via a line 38. The operations other than those are carried out the same as in the embodiment illustrated in FIG. 1.

In the foregoing, an explanation is made with reference to specified embodiments for recovering a gasoline vapor of the present invention, however, the present invention is not limited to this explanation, but many variations are possible.

When the effects of the present invention are listed with recovery of a gasoline vapor taken as an example, they are as follows.

1. Because an operation is carried out under a compressed pressure though to a comparatively low extent, a greater part of a gasoline vapor is absorbed by a cooled gasoline liquid in the first absorption column and the remaining gasoline vapor is absorbed and recovered by a heavy weight hydrocarbon liquid in the second absorption column, not only the recovery efficiency is high, but the amount of the gasoline vapor absorbed by the heavy weight hydrocarbon liquid is small, therefore, regeneration of the heavy weight hydrocarbon liquid may be easily carried out within a short period of time.

2. By the use of a low temperature gasoline liquid which is a first absorbent under a compressed pressure to a low degree and a low temperature heavy weight hydrocarbon liquid which is a second absorbent, the recovery efficiency of the gasoline vapor is raised and the operating temperature is controlled to a temperature above the freezing point, therefore, use of an antifreezing liquid and a freezing preventing agent becomes unnecessary.

3. Because the water-sealing type compressor is used for both pressurizing operation and decompressing operation, regeneration of the heavy weight hydrocarbon liquid may be carried out easily.

4. The recovering operation of the gasoline vapor and the regeneration operation of the heavy weight hydrocarbon liquid (oil) may be easily carried out by merely switching over the valves.

In the foregoing, an explanation is made with a gasoline vapor taken as an example of a solvent vapor, however, the present invention is applicable to a solvent of the aromatic series such as toluene and xylene, a solvent of the aliphatic series such as pentane and hexane and a solvent of the hydroaromatic series such as cyclopentane and cyclohexane generally used for paint, printing, leather and resin industries, further, it is applicable to a solvent of the ketone series such as methylethyl ketone and methylisobutyl ketone, besides to a solvent of the alcohol series and a solvent of the ester series. Especially, out of these solvents, a solvent of the aromatic series, a solvent of the aliphatic series and a solvent of the hydroaromatic series being contained in a gasoline vapor also, a gasoline liquid is usable as the first and second absorbents and the gasoline liquid after recovering the solvent may be used per se as gasoline. However, in case the amount of a solvent vapor in air is a trace (for example, a few 100–1000 ppm), it is more effective to recover the solvent by an absorbent such as active carbon, and an occasion when the advantage of the present invention is brought about is when a large amount (for example, at least a few percent) of a solvent vapor exists in air.

A few examples of combination of the objective solvent vapors to be recovered with the first and second absorbents will be enumerated as follows.

| Kind of solvent | First absorbent | Second absorbent |
|---|---|---|
| (Solvent of the aromatic series) Benzene, toluene, xylene | Gasoline | Gasoline |
| (Solvent of the aliphatic series) Pentane, hexane | Gasoline or paraffin having many carbon atoms such as octane | Gasoline or kerosene |
| (Solvent of the hydroaromatic series) Cyclopentane, cyclohexane | Gasoline | Gasoline or kerosene |
| (Solvent of the ketone series) Methylethyl ketone, methylisobutyl ketone | Alcohol | Alcohol |

What is claimed is :

1. A process for recovering a solvent vapor from a mixture of the solvent vapor and air comprising
    a. passing a mixed gas taken from a storing vessel for a mixed gas of a solvent vapor and air through a compressor to compress the mixed gas to a low degree and introducing the lightly compressed mixed gas to a first absorption column, bringing the lightly compressed gas into vapor-liquid contact with a first absorbent to absorb and recover a greater part of the solvent vapor in said first absorption column, and
    b. introducing a gas coming out of the first absorption column to a second absorption column and bringing said gas into vapor-liquid contact with a second absorbent circulating while being cooled in said second absorption column;
    c. after saturation of the second absorbent, by the solvent vapor, stopping the flow of said mixed gas to a compressor and returning a gas coming out from said first absorption column to a vessel storing said mixed gas, and at the same time performing
    d. causing said compressor to act as a vacuum pump and forwarding a gas from the second absorption column into the first absorption column to reduce the pressure inside the second absorption column, evaporating and gasifying a solvent component absorbed in substantially saturated state in the second absorbent, which is thereby cooled to regenerate the second absorbent;
    e. subsequently introducing an evaporated and gasified gas consisting mainly of the solvent vapor to the first absorption column, bringing said gas into vapor-liquid contact with the first absorbent to absorb and recover the solvent vapor, returning a gas containing a trace of the solvent vapor, which has not been absorbed and recovered, to said mixed gas storing vessel or supplying a part of said gas to the second absorption column to exclude the solvent component in the second absorbent.

2. The process of claim 1, wherein, after said second absorbent has been regenerated, steps (a) and (b) are repeated.

* * * * *